United States Patent
Motohashi et al.

(10) Patent No.: US 8,500,832 B2
(45) Date of Patent: Aug. 6, 2013

(54) FUEL REFORMING DEVICE

(75) Inventors: Go Motohashi, Saitama (JP); Hitoshi Mikami, Saitama (JP); Jun Iwamoto, Saitama (JP); Shinya Ishimaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 356 days.

(21) Appl. No.: 12/867,880

(22) PCT Filed: Feb. 20, 2009

(86) PCT No.: PCT/JP2009/053026
§ 371 (c)(1),
(2), (4) Date: Aug. 16, 2010

(87) PCT Pub. No.: WO2009/104735
PCT Pub. Date: Aug. 27, 2009

(65) Prior Publication Data
US 2010/0316532 A1  Dec. 16, 2010

(30) Foreign Application Priority Data
Feb. 20, 2008 (JP) .................. 2008-038611

(51) Int. Cl.
*G05B 13/00* (2006.01)
(52) U.S. Cl.
USPC ........................................ 48/197 R; 700/268
(58) Field of Classification Search
USPC .............. 422/108, 105, 107, 110; 423/DIG. 6
See application file for complete search history.

(56) References Cited

U.S. PATENT DOCUMENTS
5,471,836 A  12/1995  Takeshima et al.
5,473,887 A  12/1995  Takeshima et al.
(Continued)

FOREIGN PATENT DOCUMENTS
EP  1 211 394 A2  6/2002
EP  2 246 294 A1  11/2010
(Continued)

OTHER PUBLICATIONS

Tanaka, T. et al., "Developement of NOx Storage-Reduction 3-Way Catalyst System", Collective Papers of Society of Automotive Engineers of Japan, pp. 34-38, vol. 26, No. 4, Oct. 1995.
(Continued)

*Primary Examiner* — Imran Akram
(74) *Attorney, Agent, or Firm* — Arent Fox LLP

(57) ABSTRACT

Provided is a fuel reforming device, which can produce and supply a reformed gas in quick response to a demand for the reformed gas and which is so inexpensive as can be suitably mounted on a vehicle. The fuel reforming device feeds a material to a reforming catalyst and produces the reformed gas under a pressure higher than the atmospheric pressure. The fuel reforming device comprises a material supply means for supplying the material to the reforming catalyst, a reforming means having the reforming catalyst, for reforming the material supplied from the material supply means, to produce the reformed gas, and a run control means for controlling the run of the fuel reforming device. The run control means includes a stop mode, in which the drive of the material supply means is stopped to stop the production of the reformed gas, a reform mode, in which the material supply means is driven to produce the reformed gas, and a standby mode, in which the material supply means is driven and in which the temperature of the reforming catalyst is held within a predetermined range while producing the reformed gas as little as possible, so that the standby mode can shift instantly to the reform mode.

5 Claims, 4 Drawing Sheets

U.S. PATENT DOCUMENTS

| | | |
|---|---|---|
| 6,565,817 B1 | 5/2003 | Kiryu |
| 2003/0101713 A1 | 6/2003 | Dalla Betta et al. |
| 2005/0086931 A1 | 4/2005 | Liu et al. |
| 2006/0037308 A1 | 2/2006 | Kamijo et al. |

FOREIGN PATENT DOCUMENTS

| | | |
|---|---|---|
| JP | 2586738 B2 | 3/1997 |
| JP | 2600492 B2 | 4/1997 |
| JP | 2001-234737 A | 8/2001 |
| JP | 2002-161735 A | 6/2002 |
| JP | 2002-179405 A | 6/2002 |
| JP | 2002-235594 A | 8/2002 |
| JP | 2003-128401 A | 5/2003 |
| JP | 2004-217439 A | 8/2004 |
| JP | 3642273 B2 | 4/2005 |
| JP | 2006-506581 A | 2/2006 |
| JP | 2006-242020 A | 9/2006 |
| JP | 2007-509282 A | 4/2007 |
| JP | 2007-514090 A | 5/2007 |
| JP | 2008-038611 | 1/2012 |
| WO | WO-2004/046514 A1 | 6/2004 |
| WO | WO 2004/101965 A1 | 11/2004 |
| WO | WO 2005/042934 A3 | 5/2005 |

OTHER PUBLICATIONS

Notice of Reasons for Rejection issued to JP Application No. 2008-038611, mailed Jan. 10, 2012.

FUEL REFORMING DEVICE

CROSS-REFERENCED TO RELATED APPLICATION

This application is a National Phase entry of International Application PCT/JP2009/053026 filed Feb. 20, 2009, which claims priority to Japanese Patent Application No. 2008-038611, filed Feb. 20, 2008.

TECHNICAL FIELD

The present invention relates to a fuel reforming device that can responsively produce and supply reformed gas when reformed gas is demanded.

BACKGROUND ART

In recent years, various environmental contaminants emitted into the atmosphere from the internal combustion engines of power generators, vehicles, and the like have been viewed as a problem. Since the environmental contaminants are a main cause of acid rain and photochemical smog, they are also a major health hazard to human beings, and there has been action to globally regulate the emitted amounts thereof. In particular, with internal combustion engines such as diesel engines and lean burn engines of gasoline, since lean burn is performed, nitrogen oxides (hereinafter referred to as NOx) are emitted in a great amount, for example. Since purification of NOx and the like onboard a vehicle is not easy, progress has been made in investigating an efficient purification technique thereof.

For example, as a method of purifying NOx contained in the exhaust from an internal combustion engine in which lean burn is performed, a technique has been known in which NOx is temporarily absorbed or adsorbed via a NOx occlusion and adsorption catalyst under lean conditions in which the exhaust is oxygen excessive. With this technique, after NOx has been absorbed or adsorbed, a rich condition is produced in which the oxygen concentration is low by temporarily increasing the fuel injection amount, whereby the NOx thus absorbed or adsorbed is reduced.

For example, a technique in which a NOx absorption and purification catalyst made by combining an alkali metal such as potassium, an alkali earth metal such as barium and the like, and platinum and the like has been investigated (for example, refer to Non-patent Document 1, and Patent Documents 1 and 2). With this technique, first NOx is oxidized and absorbed on the NOx absorption and purification catalyst in the form of $NO_3^-$, using oxygen under the lean condition. Next, the oxygen concentration in the exhaust is reduced by controlling the internal combustion engine to a rich condition, and a state in which carbon monoxide and hydrocarbons exist in abundance is periodically formed, while the NOx thus absorbed under the lean conditions is catalytically reduced and purified with good efficiency using the carbon monoxide and hydrocarbons under the rich condition (under a reducing atmosphere).

In addition, with the above-mentioned technique as a basis, a technique has been investigated in which an hydrogen enrichment means disposed inside an exhaust passage and in which alkali metal and alkali earth metal are contained is provided upstream of a NOx absorption and purification catalyst composed of platinum and the like, and hydrogen-containing gas (hereinafter referred to as reformed gas) produced by this is introduced to the NOx absorption and purification catalyst disposed downstream (for example, refer to Patent Document 3). With this technique, reformed gas composed of hydrogen and carbon monoxide produced by the hydrogen enrichment means upstream is used in place of the hydrocarbons usually used as a reducing agent, during purification of NOx when rich.

In addition, as a technique resembling that of Patent Document 3, a technique has been investigated in which a hydrogen enrichment means provided separately from the exhaust passage of an internal combustion engine is operated independently from the internal combustion engine, and the reformed gas produced is introduced into the exhaust passage (for example, refer to Patent Document 4). Due to not influencing the operating conditions of the internal combustion engine such as the exhaust temperature, this technique can stably produce reformed gas to be a reducing agent of NOx compared to the technique of Patent Document 3.

A fuel reforming reaction using fuel is commonly used as the above-mentioned hydrogen enrichment means. The fuel reforming reaction is a reaction that uses hydrocarbons, which are fuel, to generate reformed gas containing hydrogen and carbon monoxide, and the reaction progresses at high temperatures of about 600° C. to 1200° C. The fuel reforming reaction is generally classified into two groups of partial oxidation reaction and steam reforming reaction according to the difference in oxidants.

A reaction that generates reformed gas containing hydrogen and carbon monoxide by way of a partial oxidation reaction is shown in reaction formula (I). This reaction is an exothermal reaction with fuel and oxygen as materials. As a result, the reaction progresses spontaneously, and thus a supply of heat from outside is unnecessary once the reaction is begun. However, in a case of fuel and oxygen coming to coexist in a high temperature state, a combustion reaction (complete oxidation reaction) as shown in reaction formula (II) also advances simultaneously on the catalyst. As a result, the catalyst temperature may rise above that intended, and thus control of the reaction is not easy.

$$C_nH_m + \tfrac{1}{2}nO_2 \rightarrow nCO + \tfrac{1}{2}mH_2 \quad (I)$$

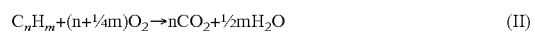

$$C_nH_m + (n+\tfrac{1}{4}m)O_2 \rightarrow nCO_2 + \tfrac{1}{2}mH_2O \quad (II)$$

A reaction that generates reformed gas containing hydrogen and carbon monoxide by way of a steam reforming reaction is shown in reaction formula (III). This reaction is an endothermic reaction with fuel and water as materials. As a result, the reaction does not advance spontaneously, a result of which supply of heat from outside is essential, while control of the reaction is easy.

$$C_nH_m + nH_2O \rightarrow nCO + (n+\tfrac{1}{2}m)H_2 \quad (III)$$

Patent Document 1: Japanese Patent No. 2586738
Patent Document 2: Japanese Patent No. 2600492
Patent Document 3: Japanese Patent No. 3642273
Patent Document 4: Japanese Unexamined Patent Application Publication No. 2006-242020
Non-patent Document 1: "Development of NOx Storage Reduction Three-way Catalyst System," Collective Papers of Society of Automotive Engineers of Japan, Vol. 26, No. 4, October 1995

DISCLOSURE OF THE INVENTION

Problems to be Solved by the Invention

However, for the emission of NOx of an internal combustion engine, for example, it has a tendency to be emitted when the air/fuel ratio (hereinafter also referred to as engine A/F) is mainly lean and during high load, which does not mean that it is usually emitted. In such a situation in which NOx and the like are not emitted, a purifying effect of NOx and the like cannot be obtained as a matter of course, even if reformed gas is produced and supplied. Contrarily, fuel is unnecessarily consumed, which has a negative impact of fuel economy. In addition, when reformed gas is introduced during cold start where the exhaust catalyst has not been sufficiently activated, a problem arises in that carbon monoxide in the exhaust gas is emitted without being purified in the exhaust passage of the internal combustion engine. Therefore, with the techniques of Patent Documents 3 and 4, in the case of using reformed gas thus produced as a reducing agent of NOx and the like, it has been demanded that the reformed gas is responsively produced and supplied synchronously with the emission periods of NOx and the like.

Incidentally, with a fuel reforming device in which the partial oxidation reaction is employed, since the reforming reaction starts to occur spontaneously, it is necessary for the highest temperature of the reforming catalyst to be at least 300° C. (activation start temperature). In addition, in order to cause to react quickly upon startup to produce and supply reformed gas, it is preferred that the highest temperature of the reforming catalyst is maintained within a range of 600° C. to 1200° C. (reaction temperature). As a result, usually, when the internal combustion engine is emitting NOx and the like, the catalyst is heated up to the activation start temperature by a heating means provided externally. Next, after the catalyst has been further heated up to the reaction temperature by self-heating from the reaction, reformed gas is produced and supplied while the reaction temperature is preserved. When the internal combustion engine is not emitting NOx and the like, the supply of reformed gas to the exhaust passage is stopped by stopping the input of materials to the reforming catalyst. Then, when the internal combustion engine emits NOx and the like again, if the highest temperature of the reforming catalyst is at least the activation start temperature, the reforming catalyst will be made to rise in temperature from only the reforming reaction due to self-heating without using the heating means. On the other hand, if the highest temperature of the reforming catalyst is no higher than the activation start temperature, a process is undergone in which the reforming catalyst is heated using a heating means from outside up to the activation start temperature, then the reforming catalyst is made to rise in temperature up to the reaction temperature by way of self-heating, and reformed gas is produced and supplied while preserving the reaction temperature.

However, in a case in which reformed gas is produced and supplied again, particularly in a state in which the highest temperature of the reforming catalyst falls below the activation start temperature when producing and supplying again, as well as for heating by way of the heating means up to the activation start temperature, a time of at least several tens of seconds is required for an operation of raising the temperature up to the reaction temperature by self-heating. As a result, it has faced a problem in that reformed gas cannot be responsively produced and supplied synchronously with the emission period of NOx of the internal combustion engine, for example.

A method of using an external heating means in order to achieve the required temperature during restart, and always maintaining the highest temperature of the reforming catalyst at least at the activation start temperature has been considered as a method to solve the above-mentioned problem. However, with this method, the amount of energy required in heating becomes immense, and thus leads to significant deterioration in the fuel economy, particularly for use on-board a vehicle.

In addition, even in a fuel reforming device employing the steam reforming reaction, heating from outside becomes necessary also during the reaction, since the steam reforming reaction is an endothermic reaction. As a result, so long as an external heating means can be normally used, a decline in the reaction temperature can be avoided; however, the amount of energy used in heating is immense, and thus leads to significant deterioration in the fuel economy, particularly for use on-board a vehicle.

On the other hand, particularly a system of a hydrogen-containing gas supply device disposed outside of the exhaust passage that is provided with a tank that temporarily stores reformed gas at a latter part of a fuel reforming vessel, temporarily stores the reformed gas produced in the tank, and introduces the reformed gas thus stored in the tank into the exhaust passage, for example, to match the emission period of NOx has been considered as another solution other than the above. With this system, the object sought for supply having good responsiveness synchronous with the emission period of NOx and the like is a supply means for supplying reformed gas stored in a tank into the exhaust passage of the internal combustion engine, and responsiveness is not sought in the fuel reformer itself. Therefore, according to this system, reformed gas can be supplied synchronously with the emission period of NOx, for example.

However, this system must operate the reformer under higher pressure since it is necessary to set the pressure inside the fuel reformer to at least the internal pressure of the tank of a later stage. As a result, the reforming reaction cannot be performed efficiently, the amount of fuel used increases, and unreformed HC may be emitted. In addition, in order to supply a sufficient amount of reformed gas into the exhaust passage, a large tank becomes necessary, a result of which constraints in the layout thereof arise when on-board a vehicle. Furthermore, since accessory types other than the reformer become necessary such as a reformed gas supply means to the tank itself and the exhaust passage, problems arise such as complication of the system being related to increases in cost.

The present invention was made taking the above such issues into account, and an object thereof is to provided a fuel reforming device that can responsively produce and supply reformed gas when reformed gas is demanded, and that is suited to being equipped to a vehicle at low cost.

Means for Solving the Problems

The present inventors have conducted thorough research to solve the above-mentioned problem. As a result, it has been found that the above-mentioned issues can be solved by a fuel reforming device provided with a stand-by mode that allows quick transition to the reforming mode, in addition to the stop mode and reforming mode, thereby arriving at completion of the present invention. More specifically, the present invention provides the following invention.

In order to achieve the above-mentioned object, the present invention provides a fuel reforming device for supplying materials composed of air and fuel to a reforming catalyst, and producing reformed gas containing hydrogen and carbon monoxide at a pressure higher than atmospheric. The fuel reforming device is provided with a material supply means that supplies the materials to the reforming catalyst, a reforming means that is provided with the reforming catalyst and produces the reformed gas by reforming the materials supplied from the material supply means, and an operation control means that controls operation of the fuel reforming device. The operation control means can execute operations of a stop mode that stops driving of the material supply means and causing the production of the reformed gas to stop, a reforming mode that causes the material supply means to be driven and the reformed gas to be produced, and a stand-by mode that causes the material supply means to be driven and makes quick transition to the reforming mode possible by maintaining a temperature of the reforming catalyst to within a predetermined range with causing the reformed gas to be minimally produced.

According to this configuration, in addition to the stop mode in which materials composed of air and fuel are not supplied to the reforming catalyst and reformed gas is not produced, and the reforming mode in which materials are supplied to the reforming catalyst and reformed gas is produced efficiently, the fuel reforming device is characterized by having a stand-by mode in which materials are supplied to the reforming catalyst, allowing for quick transition to the reforming mode by maintaining catalyst to within a predetermined range with causing the reformed gas to be minimally produced. As a result, the reforming mode can be quickly transitioned to without requiring time until the reforming catalyst is activated, when switching to the reforming mode, as in a conventional fuel reforming device. Therefore, reformed gas can be produced and supplied responsively only when reformed gas is demanded. In addition, since there is no necessity to especially use a storage means such as a tank, it is low cost, small sized, and suited to be equipped to a vehicle.

FIG. 1 schematically shows each operating mode of a fuel reforming device, operating state of an internal combustion engine corresponding to each operating mode, operating states of the fuel reforming device, and the like, in a case of applying the fuel reforming device of the present invention to exhaust purification of an internal combustion engine. As shown in FIG. 1, the operating modes of the fuel reforming device of the present invention are classified into the three types of the stop mode, the reforming mode, and the stand-by mode. It should be noted that oxygen contained in air and used in the reforming reaction is indicated in place of air in FIG. 1.

In the stop mode, materials are not input to the reforming catalyst, and there also is no production of reformed gas or rise in temperature of the reforming catalyst accompanying this. In a case of being used in the exhaust passage of the internal combustion engine, for example, the stop mode is preferably used when the internal combustion engine is stopped or reformed gas will obviously not be demanded for a long time even though the internal combustion engine is operating.

In the reforming mode, materials at an optimum air amount, fuel amount, and reforming air/fuel ratio A/F for producing reformed gas efficiently are supplied to the reforming catalyst, and the reforming catalyst is maintained at high temperature with the reformed gas being produced. In a case of being used in the exhaust passage of the internal combustion engine, for example, when the internal combustion engine is operating, the reforming mode is preferably used when NOx is being emitted such as during acceleration and high load or when treating adsorbed and occluded NOx in a NOx adsorbent occlusion catalyst.

The stand-by mode prepares for a quick mode transition to the reforming mode, in which operation is performed to supply the materials to the reforming catalyst at an optimum air amount, fuel amount, and reforming air/fuel ratio A/F so that the reforming catalyst temperature is kept at a high temperature with as little fuel amount as possible, and reformed gas such as hydrogen and carbon monoxide is minimally produced. In a case of being used in the exhaust passage of the internal combustion engine, for example, it is preferable for the stand-by mode to be used while transitioning from the stop mode to the reforming mode, and to be used at a time between reforming mode and reforming mode during which reformed gas is temporarily not demanded.

Generally, internal combustion engines emit large amounts of NOx and the like while at high revolution speed and high load, and the emitted amount of NOx and the like is small in other operating conditions. As a result, in a case of supplying reformed gas into the exhaust passage of the internal combustion engine, it is desirable for reformed gas to be produced and supplied only while at high revolution speed and high load, and reformed gas not to be produced in other operating conditions. In this regard, even in a case in which, upon temporarily entering the stop mode, a result of which the temperature of the reforming catalyst declines, the internal combustion engine has entered an operating condition in which NOx and the like are emitted again, a time of at least several tens of seconds is required until reformed gas can be produced and supplied again, and thus reformed gas cannot be responsively produced and supplied synchronously with the emission period of NOx, for example. In addition, in a case of temporarily maintaining the reforming mode as is, reformed gas will usually be supplied into the exhaust passage, and carbon monoxide in the reformed gas thus supplied will be released into the atmosphere as is, especially when the exhaust purification catalyst is inactive, and thus will have an adverse effect on emissions. Moreover, since the reformed gas thus supplied is released without being effectively used, it has an adverse effect on fuel economy as well.

In contrast, with the fuel reforming device of the present invention, at times other than when the internal combustion engine is at high revolution speed and high load, the temperature of the reforming catalyst can be maintained at the optimum temperature for the reforming reaction, with minimally producing reformed gas, by shifting the reforming mode to the stand-by mode. As a result, even when having transitioned to a condition in which NOx and the like are emitted by the internal combustion engine again, the reforming mode can be quickly switched to, and reformed gas can be produced and supplied again with a time delay of a few seconds. Therefore, according to the fuel reforming device of the present invention, reformed gas can be responsively produced and supplied synchronously with the emission period of NOx of the internal combustion engine, for example.

Preferably, the operation control means controls a highest temperature of the reforming catalyst to within a range of 300° C. to 1200° C., during operation of the stand-by mode, and during transition between modes of the stand-by mode and the reforming mode.

According to this configuration, during operation of stand-by mode and during transition between modes of the stand-by mode and the reforming mode, in the fuel reforming device, operation is performed by controlling the highest temperature of the reforming catalyst to within a range of 300° C. to 1200° C. Herein, the highest temperature of the reforming catalyst indicates a temperature of a portion in the reforming catalyst that increases in temperature the most. In the reforming reaction of fuel using a reforming catalyst, in a case of the highest temperature of the reforming catalyst falling below 300° C., which is the temperature at which the reforming reaction starts to occur spontaneously (activation start temperature), unless heated from outside, the reforming reaction will not progress even if materials are input. In other words, in a case of transitioning from the stop mode directly to the reforming mode, a heating means is necessary. Therefore, by controlling the highest temperature of the reforming catalyst to at least 300° C., the effects from setting of the stand-by mode are adequately exhibited. On the other hand, in a case of the highest temperature of the reforming catalyst having exceeded 1200° C., thermal degradation of the reforming catalyst may be accelerated, and the reforming performance may not be able to be maintained. As a result, reformed gas can be responsively produced and supplied synchronously with the emission period of NOx, for example, without causing the reforming catalyst to thermally degrade, by controlling the highest temperature of the reforming catalyst to within the range of 300° C. to 1200° C. during operation of the stand-by mode, and during transition between modes of the stand-by mode and the reforming mode. It should be noted that there is a tendency for the responsiveness during reforming mode transition to improve with the highest temperature of the reforming catalyst being higher, and thus it is preferable to control the highest temperature of the reforming catalyst to within the range of 600° C. to 1200° C. In this case, the time required in transition from the stand-by mode to the reforming mode is further shortened.

Preferably, the fuel reforming device further includes a catalyst temperature detection means for detecting a temperature of the reforming catalyst. The operation control means has a material control means for controlling an air amount, fuel amount, and reforming air/fuel ratio (A/F) of materials supplied by the material supply means, and executes operation of the stand-by mode by causing the material control means to be driven based on the temperature of the reforming catalyst detected by the catalyst temperature detection means.

According to this configuration, the fuel reforming device is provided with a catalyst temperature detection means for detecting the temperature of the reforming catalyst, and executes stand-by mode by controlling the air amount, fuel amount, and reforming air/fuel ratio (A/F) of materials supplied to the reforming catalyst based on the temperature of the reforming catalyst thus detected by this catalyst temperature detection means. By detecting the temperature of the reforming catalyst by way of the catalyst temperature detection means, the status of the reforming reaction can be accurately found, a result of which the temperature of the reforming catalyst can be maintained to within a predetermined range without causing reformed gas to be produced, and thus a stand-by mode that allows for a quick transition to the reforming mode can be executed reliably. Herein, the reforming air/fuel ratio (A/F) is different from the engine air/fuel ratio (A/F) and the exhaust air/fuel ratio (A/F), and indicates an air/fuel ratio (A/F) of raw gas supplied to the reforming catalyst provided to the reforming means of the fuel reforming device.

In addition, since the temperature of the reforming catalyst, the reforming status, and the like can be accurately found from the fluctuation of the material supply amounts during mode transition by providing the catalyst temperature detection means, transition between modes can be performed quickly and safely. In particular, in a case of transitioning between the reforming mode and the stand-by mode, when causing to transition by changing the material supply amounts, depending on the ratio and amount of materials, there are risks of the catalyst being made to increase to an extremely high temperature, or conversely of the temperature declining excessively and falling below the activation start temperature; however, mode transition is possible while always monitoring the temperature of the reforming catalyst, and thus such a risk can be avoided. In addition, by monitoring the temperature of the reforming catalyst, even assuming a case of the reforming catalyst having degraded for any reason, since the temperature thereof varies in accordance with a degradation status in a steady state such as the reforming mode, it can be used also as a degradation detection means of the reforming catalyst. It should be noted that, although it has been considered to monitor the reformed gas temperature in addition to the temperature of the reforming catalyst, the temperature of the reformed gas has a small absolute value compared to the temperature of the reforming catalyst, and has a smaller temperature swing during mode transition and the like; therefore, it is preferable to measure the temperature of the reforming catalyst.

Preferably, the material control means controls the air amount, fuel amount, and reforming air/fuel ratio (A/F) of the materials so that the reforming air/fuel ratio (A/F)s and fuel amount (C)s of the materials supplied by the material supply means in the stand-by mode satisfy relationships of formulas (1) and (2) relative to a reforming air/fuel ratio (A/F)r and fuel amount (C)r of the materials supplied by the material supply means in the reforming mode.

$$(A/F)s > (A/F)r \quad (1)$$

$$(C)s < (C)r \quad (2)$$

According to this configuration, the fuel reforming device controls the air amount, fuel amount, and reforming air/fuel ratio (A/F) of materials so that the reforming air/fuel ratio (A/F)s and the fuel amount (C)s of materials supplied by the material supply means in the stand-by mode satisfy the relationships of the above formulas (1) and (2) relative to the reforming air/fuel ratio (A/F)r and fuel amount (C)r of materials supplied by the material supply means in the reforming mode.

FIG. 2 shows relationships of the fuel amount, reforming catalyst temperature, and reformed gas production amount relative to the reforming air/fuel ratio (A/F) in the fuel reforming reaction by way of partial oxidation reaction. In the reforming reaction, certain material ratios exist at which reformed gas is produced efficiently. As a result, in the reforming mode, it is the most efficient and preferable to operate under this material ratio at a reforming air/fuel ratio (A/F)r exhibiting a temperature at which the reforming catalyst can maintain heat resistance. In addition, as shown in FIG. 2, in the stand-by mode, it is possible to make the reformed gas production amount decrease regardless of whether the reforming air/fuel ratio (A/F)s is large or small relative to the reforming air/fuel ratio (A/F)r of the reforming mode. However, in a case of the reforming air/fuel ratio (A/F)s being small relative to the reforming air/fuel ratio (A/F)r, it becomes easy for coke and unreformed HC to be generated, and is not preferred due to inducing a decline in activity of the reforming catalyst. More specifically, it also has a tendency to cause the fuel amount to increase, and thus is not preferred due to having an adverse effect also on fuel economy. As a result, although (A/F)s being greater than (A/F)r is demanded, if (C)s is temporarily equal to or greater than (C)r, the temperature of the reforming catalyst will rise relative to during the reforming mode and enter an excessively high temperature state, which is not preferred due to leading to thermal degradation of the reforming catalyst.

Therefore, by operating so that the relationships of the above formulas are satisfied, it is possible to avoid the catalyst being exposed to extremely high temperature and degrading, and coke being generated. In addition, by reducing the amount of fuel used relative to the reforming mode, the optimum temperature in the reforming reaction can be maintained without causing reformed gas to be produced, and the stand-by mode can be executed more reliably.

Preferably, the material control means controls the reforming air/fuel ratio (A/F)s to be at least stoichiometric in the stand-by mode.

Preferably, the material control means controls the reforming air/fuel ratio (A/F)r to be less than stoichiometric in the reforming mode.

According to this configuration, in the fuel reforming device, the reforming air/fuel ratio (A/F)s of materials is controlled to be at least stoichiometric in the stand-by mode, and the reforming air/fuel ratio (A/F)r of materials is controlled to be less than stoichiometric in the reforming mode. As a result, the temperature of the reforming catalyst can be maintained at high temperature without causing reformed gas to be produced in the stand-by mode, and reformed gas can be efficiently produced and supplied in the reforming mode. Herein, stoichiometric indicates a stoichiometric ratio for the complete combustion reaction.

As shown in FIG. 2, in a case of having set the fuel amount to a constant, the reformed gas production amount will change according to the reforming air/fuel ratio (A/F) of materials supplied to the reforming catalyst. Therefore, it has a property whereby reforming gas will not be produced if the reforming air/fuel ratio (A/F) is at least stoichiometric. This is because, as the reforming air/fuel ratio (A/F) becomes small relative to stoichiometric, the partial oxidation reaction to produced reformed gas advances predominantly, whereas the complete oxidation reaction, which does not produce reformed gas, progresses predominantly as the reforming air/fuel ratio (A/F) becomes large relative to stoichiometric.

In addition, in a case of having set the fuel amount to a constant, it also has a property whereby the amount of heat generated in the reforming reaction is greater in the complete oxidation reaction than the partial oxidation reaction. The present invention has applied these properties, and specifically, executes operation that can efficiently produce reformed gas by predominantly progressing the partial oxidation reaction in the reforming mode, with the reforming air/fuel ratio (A/F) being less than stoichiometric. On the other hand, in the stand-by mode, an amount of heat for maintaining the reforming catalyst at a high temperature is generated efficiently (additionally, the amount of fuel used at this time is decreased relative to the reforming mode), and reformed gas is minimally produced, preferably entirely not produced, and operation is executed with a reforming air/fuel ratio (A/F) of at least stoichiometric. This enables the roles of each mode to be sufficiently attained.

Preferably, the reforming catalyst includes: at least one type of metal catalyst component selected from the group consisting of rhodium, platinum, palladium, nickel, and cobalt; and at least one type of oxide selected from the group consisting of ceria, zirconia, alumina, and titania or a complex oxide with these as a base composition.

According to this configuration, in the fuel reforming device, a catalyst produced with at least one type of metal catalyst component selected from the group consisting of rhodium, platinum, palladium, nickel, and cobalt, and at least one type of oxide selected from the group consisting of ceria, zirconia, alumina, and titania or a complex oxide with these as a base composition is used as the reforming catalyst. As a result, efficient operation in the reforming mode and stand-by mode is achieved. As properties demanded in the reforming catalyst of the present invention, although the activation start temperature being no higher than 300° C., the partial oxidation reaction activity being high in the reforming mode, the complete oxidation reaction activity being high in the stand-by mode, and thermal degradation being small relative to the application temperature up to 1200° C., etc. can be exemplified, so long as it is a reforming catalyst selected from within the above-mentioned, these properties will be included. In a case of using a reforming catalyst other than the above-mentioned, for example, the activation start temperature will be high at 300° C. or higher, a result of which more time will be required for mode transition, and the catalytic activity itself will be low, a result of which sufficient reformed gas will not be produced in the reforming mode, and thus a high temperature will not be able to be maintained in the stand-by mode, which is not preferable.

Preferably, the fuel reforming device is used for supplying the reformed gas to an exhaust system of an internal combustion engine. The operation control means includes a mode switching period determination means for determining the switching period of each of the modes based on operational information of the internal combustion engine.

According to this configuration, the fuel reforming device is used for supplying reformed gas to the exhaust system of an internal combustion engine, and is provided with a mode switching period determination means for determining the switching period of each of the modes of the stop mode, reforming mode, and stand-by mode, based on operational information of the internal combustion engine. As a result, reformed gas can be responsively produced and supplied synchronously with the NOx emission period of the internal combustion engine. As operational information of the internal combustion engine, the engine revolution speed, fuel injection amount, exhaust air/fuel ratio (A/F), intake air amount, exhaust purification catalyst temperature, etc. can be exemplified. From this operational information, the NOx emission behavior of the internal combustion engine is estimated, and the switching period of the operation modes is determined. In addition, in a case of using the NOx occlusion and adsorption catalyst as an exhaust purification catalyst by disposing in the exhaust system, since the NOx occlusion and adsorption amount has dependence on the temperature of the exhaust purification catalyst, it is preferable to determine the mode switching period based on the temperature information of the exhaust purification catalyst.

Figure 1:
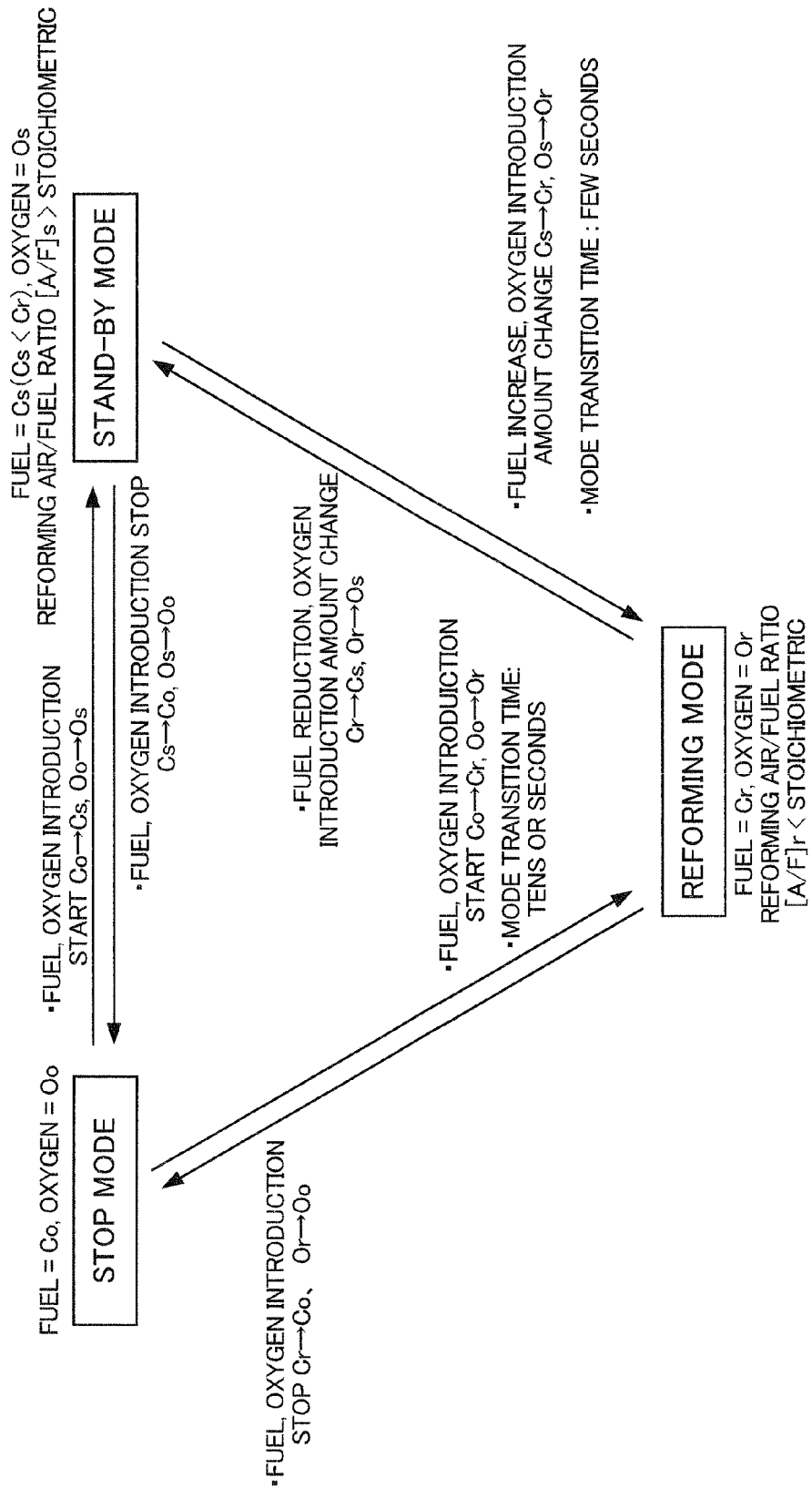
FIG. 1 is a chart for illustrating operation modes of a fuel reforming device according to the present invention.
Figure 2:
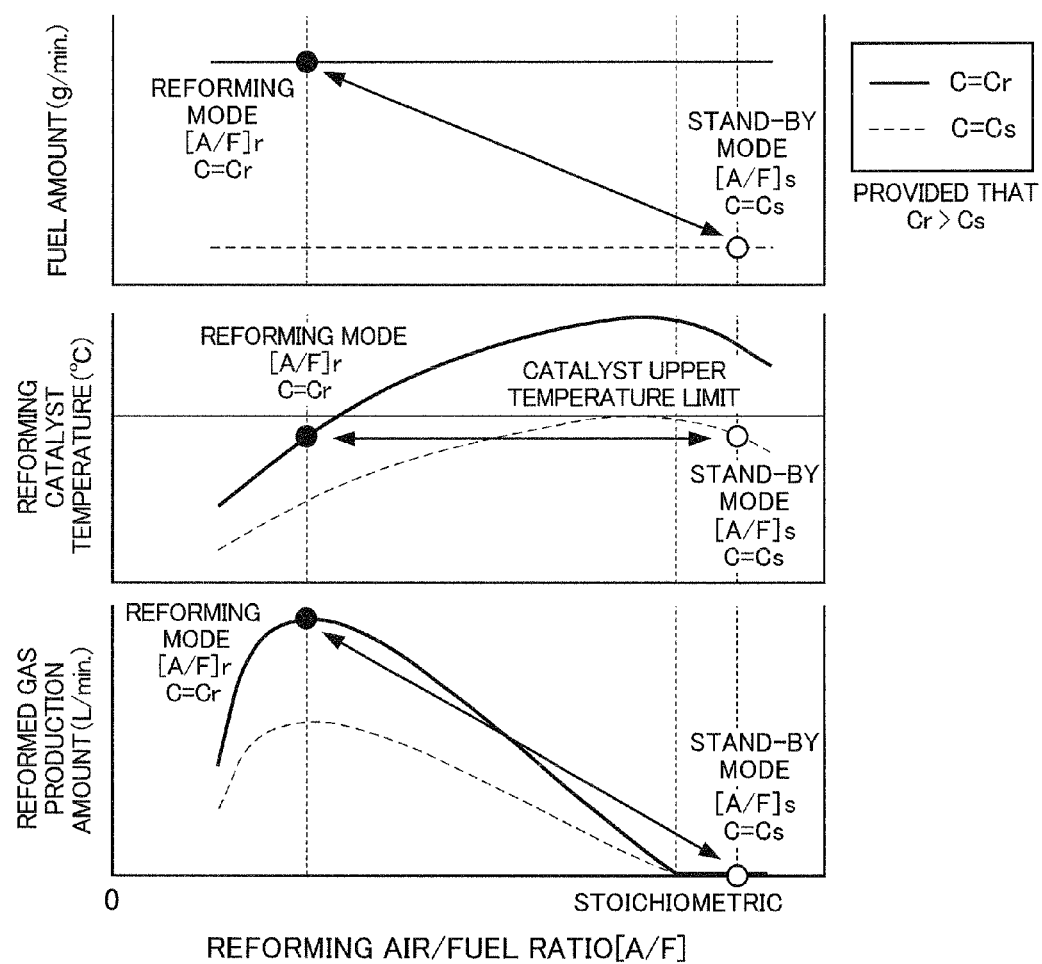
FIG. 2 is a graph illustrating a reforming mode and a stand-by mode of the fuel reforming device according to the present invention.

| EXPLANATION OF REFERENCE NUMERALS | |
|---|---|
| 10 | Fuel reforming device |
| 11 | Material supply unit |
| 12 | Reforming unit |
| 13 | Catalyst temperature sensor |
| 14 | ECU |

PREFERRED MODE FOR CARRYING OUT THE INVENTION

Hereinafter, an embodiment of the present invention will be explained in detail while referring to the drawings.

Figure 3:
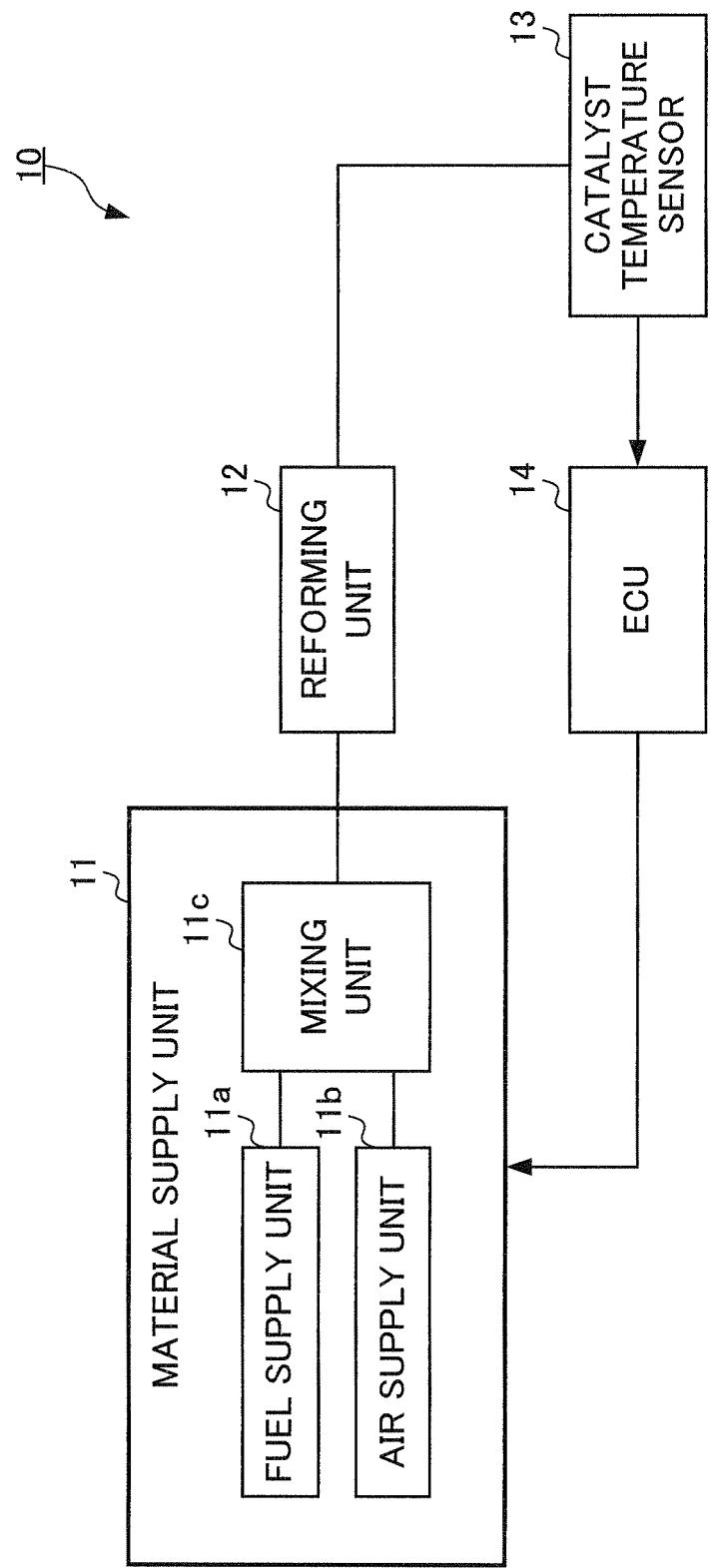
FIG. 3 is a block diagram of a fuel reforming device according to an embodiment of the present invention.

FIG. 3 is a block diagram of a fuel reforming device 10 according to the embodiment of the present invention. The fuel reforming device 10 according to the present embodiment is provided with a material supply unit 11 as a material supply means, a reforming unit 12 as a reforming means, a catalyst temperature sensor 13 as a catalyst temperature detection means, and an ECU (electronic control unit) 14.

The fuel used in the present embodiment is not particularly limited to gasoline, diesel, or the like, so long as it contains hydrocarbons. Preferably, a fuel containing a great amount of heavy hydrocarbons is used, and more preferably, diesel is used.

The material supply unit 11 may be anything capable of supplying materials composed of air and fuel to the reforming unit 12, and is configured by a fuel supply unit 11a, an air supply unit 11b, a mixing unit 11c, and the like. The material supply unit 11 configured by these is electrically connected by the ECU 14, and the fuel amount, air amount, and reforming air/fuel ratio (A/F) are controlled by the ECU 14 through the fuel supply unit 11a, air supply unit 11b, and mixing unit 11c.

The fuel supply unit 11a may be provided with a fuel passage through which fuel flows, a fuel supply valve in which the valve-open time and valve-closed time are controlled by the ECU 14, and an injector that injects the fuel flowing in the fuel passage. The fuel passage has one end connected to a fuel tank, and another end connected to the injector. The fuel passage leads fuel stored in the fuel tank to the injector from the fuel tank. The injector injects fuel flowing through the fuel passage into the mixing unit 11c. The fuel thus injected is vaporized inside the mixing unit 11c, and is mixed uniformly with air.

The air supply unit 11b may be provided with an air passage through which air flows, an air supply valve in which the valve-open time and valve-closed time are controlled by the ECU 14, and a suction pump that aspirates air and leads it into the mixing unit 11c by making the pressure inside of this air passage to be negative pressure. One end of the air passage 12a is connected to an air filter, and the other end is connected to the mixing unit 11c.

With the mixing unit 11c, mixed gas in which fuel supplied from the fuel supply unit 11a and air supplied from the air supply unit 11b is uniformly mixed is produced. The mixed gas thus mixed inside the mixing unit 11c is led into the reforming unit 12.

The reforming unit 12 is provided with a reforming catalyst. The materials supplied from the material supply unit 11 are reformed by way of a reforming reaction by the action of the reforming catalyst, and are converted to reformed gas containing hydrogen and carbon monoxide. The reforming catalyst is not particularly restricted, and a conventionally known reforming catalyst can be used. More specifically, it is preferable to use a reforming catalyst that includes at least one type of a metal catalyst component selected from the group consisting of rhodium, platinum, palladium, nickel, and cobalt, and at least one type of oxide selected from the group consisting of ceria, zirconia, alumina, and titania, or a complex oxide with these as a base composition. These reforming catalysts are preferably used by loading on a honeycomb structure made of cordierite.

So long as the catalyst temperature sensor 13 can detect the temperature of the reforming catalyst, a conventionally known temperature sensor can be used. The catalyst temperature sensor 13 is electrically connected by the ECU 14, and signals detected by the catalyst temperature sensor 13 are supplied to the ECU 14.

The ECU 14 is provided with an input circuit having functions of shaping input signal waveforms from various sensors, correcting the voltage levels to predetermined levels, converting analogy signal values to digital signal values, etc., and a central processing unit (hereinafter referred to as "CPU"). In addition, the ECU 14 is provided with a memory circuit that stores various operational programs executed by the CPU, calculation results, etc., and an output circuit that outputs control signals to the material supply unit 11, reforming unit 12, and the like.

In the fuel reforming device 10 according to the present embodiment, the ECU 14 is configured by an operation control means for controlling operation of the fuel reforming device 10, and the like. The operation control means is configured to be able to execute operations of a stop mode that stops driving of the material supply unit 11 and causes the production of the reformed gas to stop, a reforming mode that causes the material supply unit 11 to be driven and the reformed gas to be produced, and a stand-by mode that makes quick transition to the reforming mode possible by maintaining a temperature of the reforming catalyst to within a predetermined range without driving the material supply unit 11 and with causing the reformed gas to be minimally produced.

The operation control means controls the highest temperature of the reforming catalyst to within a range of 300° C. to 1200° C. during operation of the stand-by mode and during transition between modes of the stand-by mode and the reforming mode. In addition, the operation control means is provided with a material control means for controlling the air amount, fuel amount, and air/fuel ratio of materials supplied by the material supply unit 11. Moreover, in a case of the fuel reforming device 10 being used in order to supply reformed gas to an exhaust system of an internal combustion engine, the operation control means is further provided with a mode switching period determination means for determining the switching period of each mode based on operational information of the internal combustion engine.

Effects of the fuel reforming device 10 according to the present embodiment will be explained. According to the fuel reforming device 10 relating to the present embodiment, due to having a stand-by mode in which materials are supplied to the reforming catalyst, allowing for quick transition to the reforming mode by maintaining catalyst to within a predetermined range with causing the reformed gas to be minimally produced, the reforming mode can be transitioned to instantly without requiring time until the reforming catalyst is activated, when switching to the reforming mode.

In addition, according to the fuel reforming device 10 relating to the present embodiment, during operation of stand-by mode and during transition between modes of the stand-by mode and reforming mode, reformed gas can be responsively produced and supplied synchronously with an emission period of NOx, for example, without causing the reforming catalyst to thermally degrade, by controlling the highest temperature of the reforming catalyst to operate within a range of 300° C. to 1200° C.

Moreover, according to the fuel reforming device 10 relating to the present embodiment, the status of the reforming reaction can be accurately found by controlling the air amount, fuel amount, and reforming air/fuel ratio (A/F) of materials supplied to the reforming catalyst, based on the temperature of the reforming catalyst detected by the catalyst temperature sensor 13, a result of which the temperature of the reforming catalyst can be reliably maintained to within a predetermined range without causing reformed gas to be produced, and thus the reforming mode can be quickly transition to. Additionally, since the temperature of the reforming catalyst, the reaction status, and the like can be accurately found from the fluctuation of the material supply amounts during mode transition, transition between modes can be performed quickly and safely.

Furthermore, according to the fuel reforming device 10 relating to the present embodiment, it is possible to prevent degrading of the catalyst due to being exposed to extremely high temperatures, and coke from forming, by way of controlling the air amount, fuel amount, and reforming air/fuel ratio (A/F) of materials so that the reforming air/fuel ratio (A/F)s and fuel amount (C)s of material supplied by the material supply unit 11 in the stand-by mode satisfy relationships of the above-mentioned formulas (1) and (2) relative to the reforming air/fuel ratio (A/F)r and fuel amount (C)r of materials supplied by the material supply unit 11 in the reforming mode. In addition, by decreasing the fuel amount used relative to the reforming mode, the optimum temperature in the reforming reaction can be maintained without causing reformed gas to be produced, and thus the stand-by mode can be reliably executed.

Moreover, according to the fuel reforming device 10 relating to the present embodiment, by controlling the reforming air/fuel ratio (A/F)s of materials to at least stoichiometric in the stand-by mode, and controlling the reforming air/fuel ratio (A/F)r of materials to less than stoichiometric in the reforming mode, reforming gas can be efficiently produced by predominantly progressing the partial oxidation reaction in the reforming mode, whereas the complete oxidation reaction progresses more predominantly in the stand-by mode, whereby an amount of heat for maintaining the reforming catalyst at a high temperature can be generated efficiently without causing reformed gas to be produced.

Furthermore, in a case of using the fuel reforming device 10 according to the present embodiment in order to supply reformed gas to the exhaust system of an internal combustion engine, the switching between each mode of the stop mode, reforming mode, and stand-by mode can be determined based on operational information of the internal combustion engine; therefore, reformed gas can be responsively produced and supplied synchronously with a NOx emission period of the internal combustion engine, for example. In particular, the effects of the present invention are notably exhibited by supplying reformed gas produced by the fuel reforming device 10 according to the present embodiment, upstream of a NOx purification catalyst disposed in the exhaust system of an internal combustion engine that is controlled to be lean or rich.

Embodiments

Although the Example of the present invention will be explained in detail hereinafter, the present invention is not to be limited to the following Example.

Preparation of Reforming Catalyst

A slurry was prepared by weighing raw material powders so that rhodium relative to ceria was 1% by mass ratio, then placing in a ball mill along with an aqueous medium, and agitating and mixing. A reforming catalyst of 1% Rh/$CeO_2$ by mass was prepared by coating the slurry thus obtained on a 50-cc carrier made of metal at 100 g/L, then performing drying and calcining for 2 hours at 600° C.

Reforming Test

The reforming catalyst thus prepared was filled into a reforming vessel, and a reforming test was conducted. The reforming test was performed by separating the operating conditions of the reforming vessel into three stages. More specifically, in Example 1, a reforming test was conducted by sequentially employing the (1) reforming mode, (2) stand-by mode, and (3) reforming mode as the operation mode of the reforming vessel. In addition, in Comparative Example 1, the reforming test was conducted by sequentially employing the (1) reforming mode, (2) stop mode, and (3) reforming mode, and in Comparative Example 2, by sequentially employing the (1) reforming mode, (2) reforming mode, and (3) reforming mode. It should be noted that the air amount and fuel amount of materials in each operation mode were as follows. It should be noted that a synthetic-air compressed gas cylinder of $O_2$=20.9% was used as the air, and US certified diesel (H/C)=1.81 (mol/mol) was used as the fuel, respectively. In addition, the following $\Lambda$ represents a ratio of air and fuel when the reforming air/fuel ratio (A/F) over stoichiometric is set to 1.

Figure 4:
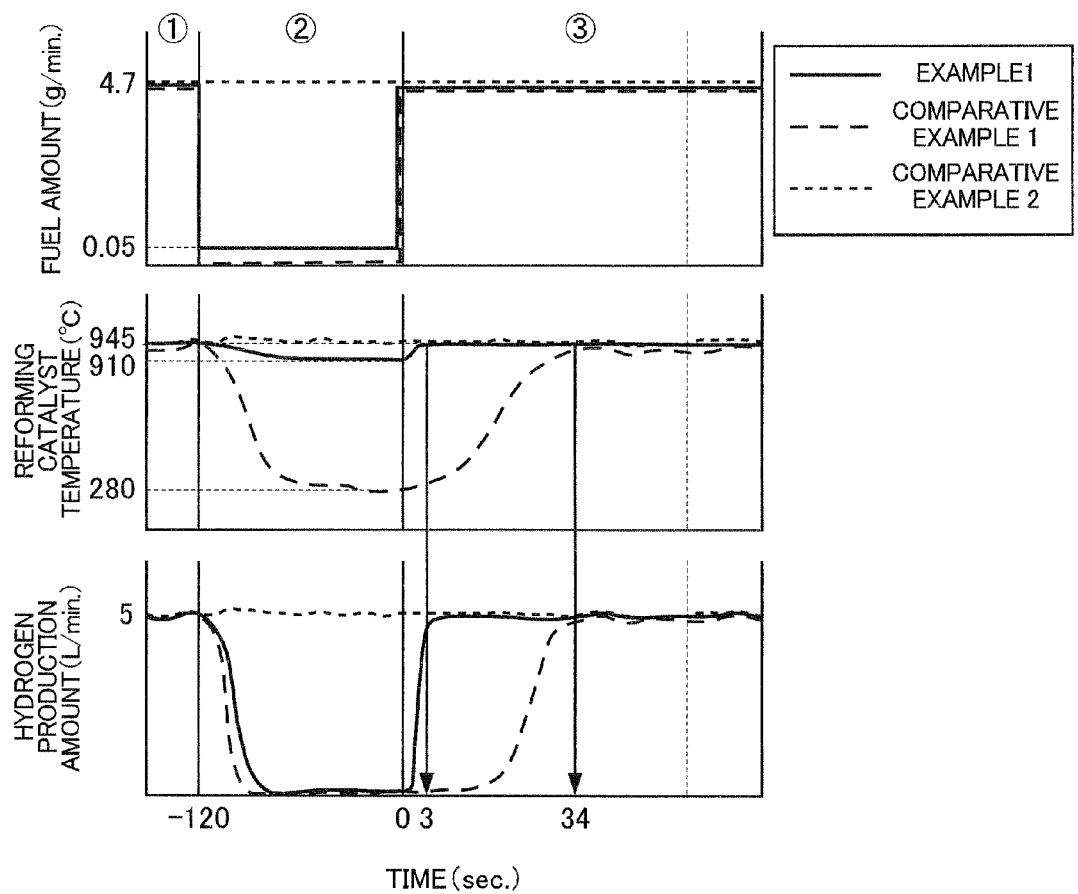
FIG. 4 is a graph showing test results of the Example and Comparative Examples.

Reforming Mode
  Air amount: 20 L/min
  Fuel amount: 4.8 g/min ($\Lambda$=0.33)
Stand-By Mode
  Air amount: 0.7 L/min
  Fuel amount: 0.05 g/min ($\Lambda$=1.16)
Stop Mode
  Air amount: 0 L/min
  Fuel amount: 0 g/min The reforming tests were conducted at the above-mentioned conditions, and the amount of fuel used in mode (2), hydrogen production amount in mode (2), reforming catalyst temperature during transition from mode (2) to mode (3), and the time required to produce hydrogen again in mode (3) were each measured. In the analysis of the reformed gas, the hydrogen production amount was measured using a mass spectrometer made by Pfeiffer Vacuum Inc. The test conditions and test results for the Example and each Comparative Example are shown in Table 1. In addition, time courses of the fuel amount, reforming catalyst temperature, and hydrogen production amount for the Example and each Comparative Example are shown in FIG. 4.

TABLE 1

| | TEST CONDITIONS | | | TEST RESULTS | | | |
|---|---|---|---|---|---|---|---|
| | OPERATING MODE 1 | OPERATING MODE 2 | OPERATING MODE 3 | AMOUNT OF FUEL USED IN MODE 2 (g/min) | HYDROGEN PRODUCTION AMOUNT IN MODE 2 (L/min) | REFORMING TEMPERATURE DURING MODE 2→3 | REFORMED GAS PRODUCTION TIME IN MODE 3 |
| EXAMPLE 1 | REFORMING MODE | STAND-BY MODE | REFORMING MODE | 0.05 | <0 | 910 | 3 |
| COMPALATIVE EXAMPLE 1 | REFORMING MODE | STOP MODE | REFORMING MODE | 0 | <0 | 280 | 34 |

TABLE 1-continued

| | TEST CONDITIONS | | | TEST RESULTS | | | |
|---|---|---|---|---|---|---|---|
| | | | | AMOUNT OF FUEL USED | HYDROGEN PRODUCTION AMOUNT IN | REFORMING TEMPERATURE | REFORMED GAS PRODUCTION |
| | OPERATING MODE 1 | OPERATING MODE 2 | OPERATING MODE 3 | IN MODE 2 (g/min) | MODE 2 (L/min) | DURING MODE 2→3 | TIME IN MODE 3 |
| COMPALATIVE EXAMPLE 2 | REFORMING MODE | REFORMING MODE | REFORMING MODE | 4.8 | 20 | 945 | — |

Results

As shown in Table 1 and FIG. 4, for Comparative Example 1 in which transition was performed from the stop mode to the reforming mode, after the stop mode was temporarily entered, the reforming mode was transitioned to again, and a time as long as 34 seconds was required until reformed gas (hydrogen) was sufficiently produced. In contrast, for Example 1 in which transition was performed from the stand-by mode to the reforming mode, after the stand-by mode was temporarily entered, the reforming mode was transitioned to again, and reformed gas (hydrogen) could be produced in as little as 3 seconds. It is considered that reformed gas (hydrogen) could be produced responsively when transitioning to the reforming mode because the reforming catalyst temperature has been kept at a high temperature of 910° C. in the stand-by mode. In addition, the hydrogen production amount in the stand-by mode is approximately 0, and thus it was recognized that no reformed gas was produced either. On the other hand, the fuel amount in the stand-by mode of Example 1 was 0.05 g/min, which is approximately 1/100 the fuel amount of the reforming mode of Comparative Example 2. From this it could be recognized that, by setting the reforming air/fuel ratio (A/F) in the stand-by mode to at least 1, the amount of fuel used could be curbed relative to continuing supplying reformed gas in the reforming mode. Therefore, the effects of the present invention have been demonstrated by the present test results.

The invention claimed is:

1. A fuel reforming device for supplying materials including air and fuel to a reforming catalyst and producing reformed gas containing hydrogen and carbon monoxide at a pressure higher than atmospheric, the device comprising:
a material supply means for supplying the materials to the reforming catalyst;
a reforming means for producing the reformed gas by reforming the materials supplied from the material supply means, and that includes the reforming catalyst;
a catalyst temperature detection means for detecting a temperature of the reforming catalyst, and
an operation control means programmed to control operation of the fuel reforming device by performing a stop mode that stops driving of the material supply means and causes the production of the reformed gas to stop, a reforming mode that causes the material supply means to be driven and the reformed gas to be produced, and a stand-by mode that causes the material supply means to be driven and makes quick transition to the reforming mode possible by maintaining a temperature of the reforming catalyst to within a predetermined range with causing the reformed gas to be minimally produced, and is programmed to control a highest temperature of the reforming catalyst to within a range of 300° C. to 1200° C., during operation of the stand-by mode, and during transition between modes of the stand-by mode and the reforming mode, and
wherein the operation control means includes a material control means programmed to control an air amount, fuel amount, and reforming air/fuel ratio (A/F) of materials supplied by the material supply means, and is programmed to execute operation of the stand-by mode by causing the material control means to be driven based on the temperature of the reforming catalyst detected by the catalyst temperature detection means, and
wherein the material control means is programmed to control the air amount, fuel amount, and the reforming air/fuel ratio (A/F) of the materials so that the reforming air/fuel ratio (A/F)s and fuel amount (C)s of the materials supplied by the material supply means in the stand-by mode satisfy relationships of formulas (1) and (2) relative to a reforming air/fuel ratio (A/F)r and fuel amount (C)r of the materials supplied by the material supply means in the reforming mode, Formulas:

$$(A/F)s > (A/F)r \tag{1}$$

$$(C)s \ (C)r \tag{2}$$

wherein the temperature of the reforming catalyst exhibits a convex-upward characteristic so as to reach a maximum near stoichiometric, when the air/fuel ratio is made to change while keeping the fuel amount constant, and
wherein the fuel amount (C)s in the stand-by mode is set to an amount so that a maximum temperature at the near stoichiometric does not exceed a catalyst operating temperature upper limit.

2. A fuel reforming device according to claim 1, wherein the material control means is programmed to control the reforming air/fuel ratio (A/F)s to be at least stoichiometric during operation of the stand-by mode.

3. A fuel reforming device according to claim 1, wherein the material control means is programmed to control the reforming air/fuel ratio (A/F)r to be less than stoichiometric during operation of the reforming mode.

4. A fuel reforming device according to claim 1, wherein the reforming catalyst includes: at least one type of metal catalyst component selected from the group consisting of rhodium, platinum, palladium, nickel, and cobalt; and at least one type of oxide selected from the group consisting of ceria, zirconia, alumina, and titania or a complex oxide with these as a base composition.

5. A fuel reforming device according to claim 1 further including an exhaust system of an internal combustion engine,
wherein the operation control means includes a mode switching period determination means for determining a switching period of each of the modes based on operational information of the internal combustion engine.

* * * * *